United States Patent
Kovacs et al.

(10) Patent No.: US 11,965,616 B2
(45) Date of Patent: Apr. 23, 2024

(54) MULTIPORT DISCONNECT COUPLINGS

(71) Applicant: Singular Genomics Systems, Inc., La Jolla, CA (US)

(72) Inventors: Sandor Kovacs, Middletown, DE (US); David Baranson, Encinitas, CA (US)

(73) Assignee: Singular Genomics Systems, Inc., San Diego, CA (US)

( * ) Notice: Subject to any disclaimer, the term of this patent is extended or adjusted under 35 U.S.C. 154(b) by 214 days.

(21) Appl. No.: 17/682,508

(22) Filed: Feb. 28, 2022

(65) Prior Publication Data
US 2022/0252196 A1    Aug. 11, 2022

Related U.S. Application Data

(63) Continuation of application No. PCT/US2021/058660, filed on Nov. 9, 2021.

(60) Provisional application No. 63/114,895, filed on Nov. 17, 2020.

(51) Int. Cl.
*F16L 39/00* (2006.01)
*F16L 37/56* (2006.01)

(52) U.S. Cl.
CPC ......... *F16L 39/00* (2013.01); *B01L 2200/027* (2013.01); *F16L 37/56* (2013.01); *F16L 2201/40* (2013.01)

(58) Field of Classification Search
CPC . F16L 39/00; F16L 39/02; F16L 37/56; F16L 2201/40; F16L 5/14; B01L 2200/027; A61M 39/105
See application file for complete search history.

(56) References Cited

U.S. PATENT DOCUMENTS

| | | | | | |
|---|---|---|---|---|---|
| 2,438,679 | A | * | 3/1948 | Parker | F16L 39/00 |
| 3,469,863 | A | * | 9/1969 | Riester | F16L 37/56 |
| 3,503,634 | A | * | 3/1970 | Cadiou | F16L 39/02 |
| 3,960,393 | A | * | 6/1976 | Hosokawa | F16L 39/02 |
| 4,630,847 | A | | 12/1986 | Blenkush | |
| 4,754,993 | A | * | 7/1988 | Kraynick | F16L 37/56 |
| 5,236,227 | A | * | 8/1993 | Adams | F16L 39/00 |
| 5,478,119 | A | | 12/1995 | Dye | |
| 6,209,928 | B1 | | 4/2001 | Benett et al. | |
| 7,311,882 | B1 | | 12/2007 | Renzi | |
| 8,039,817 | B2 | | 10/2011 | Feng et al. | |
| 8,241,573 | B2 | | 8/2012 | Banerjee et al. | |
| 2006/0006065 | A1 | | 1/2006 | Pinkas et al. | |
| 2009/0121476 | A1 | | 5/2009 | Malito et al. | |

(Continued)

OTHER PUBLICATIONS

Brenner, S. et al. (Jun. 2000). "Gene expression analysis by massively parallel signature sequencing (MPSS) on microbead arrays," *Nature biotechnology* 18(6): 630-634.

(Continued)

*Primary Examiner* — William S. Choi
(74) *Attorney, Agent, or Firm* — Mintz, Levin, Cohn, Ferris, Glovsky, Popeo, P.C.; Zachary L. Terranova

(57) ABSTRACT

A connector assembly is configured to fluidly and removably connect a first set of microtubes to a second set of microtubes of a microfluidic device. The connector assembly provides multiple points of contact to the microtubes to provide a secure connection between the connector assembly and the microtubes. A single gasket provides a securely aligned connection between microtubes.

19 Claims, 8 Drawing Sheets

(56) References Cited

U.S. PATENT DOCUMENTS

2012/0270305 A1  10/2012  Reed et al.

OTHER PUBLICATIONS

Dolomite Inline Interfaces Data Sheet, The Dolomite Centre Ltd located at <https://www.dolomite-microfluidics.com/product/circular-in-line-interface/> last accessed Aug. 16, 2023.
International Search Report and Written Opinion dated Jan. 31, 2022, for PCT application PCT/US2021/058660, filed Nov. 9, 2021, 8 pages.
Margulies, M. et al. (Sep. 15, 2005, e-published Jul. 31, 2005). "Genome sequencing in microfabricated high-density picolitre reactors," *Nature* 437(7057): 376-380.
Ronaghi, M. et al. (Jul. 17, 1998). "A sequencing method based on real-time pyrophosphate," *Science* 281(5375): 363-365.

\* cited by examiner

MULTIPORT DISCONNECT COUPLINGS

CROSS-REFERENCES TO RELATED APPLICATIONS

This application is a continuation of PCT/US2021/058660, filed Nov. 9, 2021, which claims the benefit of U.S. Provisional Application No. 63/114,895, filed Nov. 17, 2020, which are incorporated herein by reference in their entirety and for all purposes.

BACKGROUND

Microfluidic devices include microchannels and microtubing instead of test tubes or microplates to carry out analyses and reactions. Service and maintenance of microfluidic devices both remain challenging tasks. Such tasks often require hours of downtime as a specialist dismantles and disconnects the electronic circuitry, fluidic tubing, and additional components to evaluate, diagnose, and/or repair the microfluidic device.

Specialized connectors exist for accommodating electrical wires and components for microfluidic devices. A need exists for systems and methods configured to rapidly disconnect and/or reconnect fluidic plumbing of a microfluidic device without sacrificing efficiency or the capability of hardware. Disclosed herein are solutions to these and other problems in the art.

SUMMARY

In view of the foregoing, disclosed herein are systems and methods configured to rapidly disconnect and/or reconnect fluidic plumbing of a microfluidic device. The systems and methods can include specialized, mechanical couplings for use in microfluidic devices wherein the couplings address the aforementioned challenges.

In an aspect, a microfluidic coupling device is provided. There is disclosed a multiport coupling device of a microfluidic device, comprising: a first connector that includes at least two bores; a second connector that includes at least two bores, wherein the second connector couples to the first connector; a gasket seated in the first connector, wherein the gasket defines a connection location configured to receive at least a first microtube and a second microtube and wherein the connection location of the gasket provides a seal between the first microtube and the second microtube; a first retention mechanism configured to retain the first microtube within the multiport coupling device; and a second retention mechanism configured to retain the second microtube within the coupling device.

In another aspect, there is disclosed a microfluidic device, comprising: two or more inlet microtubes; two or more outlet microtubes; a multiport coupling device configured to connect the two or more inlet microtubes to the two or more outlet microtubes at a connection location, the multiport connector comprising; a first connector that includes a plurality of bores in which the two or more inlet microtubes are seated; a second connector that includes a plurality of bores in which the two or more outlet microtubes are seated, wherein the second connector couples to the first connector; a gasket seated in the first connector, wherein the connection location is positioned entirely within the gasket; a first retention mechanism of the plurality of bores of the first connector, the first retention mechanism configured to retain the two or more inlet microtubes within the first connector; and a second retention mechanism of the plurality of bores of the second connector, the second retention mechanism configured to retain the two or more outlet microtubes within the second connector. In embodiments, the device includes 2, 3, 4, 5, 6, 7, 8, 9, 10, 11, or 12 inlet microtubes. In embodiments, the device includes 6 to 18 inlet microtubes. In embodiments, the device includes 12 inlet microtubes. In embodiments, the device includes 2, 3, 4, 5, 6, 7, 8, 9, 10, 11, or 12 outlet microtubes. In embodiments, the device includes 6 to 18 outlet microtubes. In embodiments, the device includes 12 outlet microtubes.

The details of one or more variations of the subject matter described herein are set forth in the accompanying drawings and the description below. Other features and advantages of the subject matter described herein will be apparent from the description and drawings, and from the claims.

DETAILED DESCRIPTION

Definitions

Figure 1A:
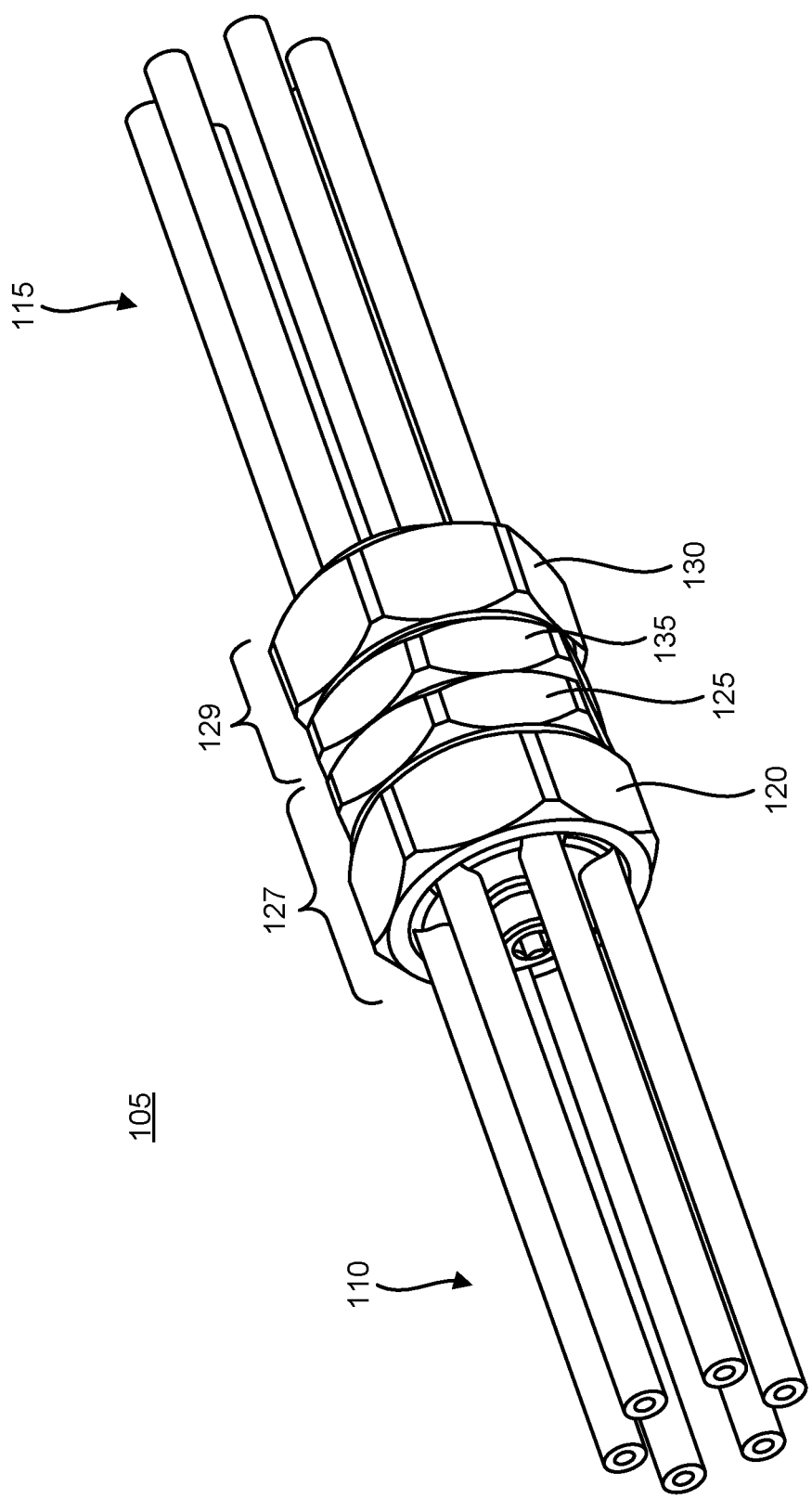
FIG. 1A shows a perspective view of a connector assembly that is configured to fluidically and mechanically couple a first set of microtubes to a second set of microtubes of a microfluidic device.

The terms "fluidically coupled," "fluidically connected" and "fluidly connect" as used herein means linked to permit fluid to pass from one element (e.g., tube) to another.

A "microfluidic device" is used in accordance with its ordinary meaning and refers to an integrated system of one or more chambers, ports, and channels that are interconnected and in fluid communication and designed for carrying out an analytical reaction or process, either alone or in cooperation with an appliance or instrument that provides support functions. Microfluidic devices may further include valves, pumps, and specialized functional coatings on interior walls, e.g. to prevent adsorption of sample components or reactants, facilitate reagent movement by electroosmosis, or the like. Features of a microfluidic device usually have cross-sectional dimensions of less than a few hundred square micrometers and passages typically have capillary dimensions, e.g. having maximal cross-sectional dimensions of from about 500 µm to about 0.1 µm. Microfluidics devices typically have volume capacities in the range of from 1 µm to a few nL (e.g., 10-100 nL). The term "microtube" is used in accordance with its ordinary meaning and refers to a hollow conduit capable of holding and conducting objects, liquids, or gases, typically having an internal diameter of 1 mm-10 mm. In embodiments, the internal diameter of the microtube is 1/64 inch (0.39 mm), 1/32 inch (0.79 mm), 1/16 inch (1.58 mm), 1/8 inch (3.17 mm), 5/32 inch (3.96 mm), 3/16 inch (4.76 mm), or 1/4 inch (6.35 mm). Flow within a microtube is regulated by the inside diameter of the tube and the length of tubing used. Microtubes may be manufactured out of any suitable material, including, but not limited to polypropylene, polytetrafluoroethylene (PTFE) (e.g., Teflon™; Teflon™ is a registered trademark of the Chemours Company of Wilmington, Del., USA), fluorinated ethylene propylene (FEP), polyether ether ketone (PEEK), ethylene tetrafluoroethylene (ETFE), or Tygon® thermoplastic (e.g., R-3603). Such microtubes, such as PTFE, can be chosen in order to, e.g., minimize interaction with the reagents. The diameter of the microtubes can vary between embodiments, but can be chosen based on other factors such as, for example, the desire to decrease "dead volume" or the amount of fluid left in the microtubes.

The term "align" or "alignment" is used in accordance with its ordinary meaning and refers to perfect alignment and alignment with relatively small, insignificant amount of deviation/misalignment (e.g., ≤5%).

Different elements and components described herein may be removably coupled or removably connected. As used herein, when two or more elements or components are "removably coupled" (or "removably connected," and other similar terms) the elements are readily separable without destroying the coupled components. For example, elements can be readily separable when the elements may be separated from each other without undue effort, e.g., without the use of a tool (i.e. by hand), or without a significant amount of time spent in separating the components.

Microfluidic Device Connector Assembly

Described herein are methods and devices for rapidly connecting and disconnecting microtubes of a microfluidic device. Within microfluidic devices, several fluid connections (via microtubes) are typically routed into a tight space with each microtube needing to be mated with a proper port. To replace a microtube or service the microfluidic device, many components often need to be removed to gain access to the microtube or region of interest. This can require the removal or installation of several microtube connections individually, often in very tight spaces. These issues have traditionally been dealt with through requiring some minimal spacing between ports, resulting rather bulky installations, or cumbersome microtube routing.

Current commercial offerings for circular in-line interfaces between microtubes have several characteristics that increase the probability of failure during use. Such characteristics include only having a single point of contact (e.g., a single sharp or distinct edge for clamping each tube) and having two gaskets to direct tube end alignment. Perfect alignment between microtubes is not guaranteed in existing interfaces that rely on separate gaskets in each of the two connectors, increasing the possibility that fluid may contact the gasket and/or create a flow choke point. Furthermore, existing interfaces rely on a pin and slot mechanism to align the two halves of the interface with a face-to-face alignment, which is susceptible to misalignment if the pin or slot are slightly loose relative to one another. The disclosed microtube connector assembly can include a key-notch feature configured to prevent rotation of the two halves of the microtube connector assembly and facilitate alignment. For example, the key-notch feature enables 1:1 registration between the two sets of tubes allowing, for example tube A1 to mate with tube A2, and tube B1 to mate to tube B2, etc. The disclosed system addresses, among other challenges, the problems of interface misalignment and tubing retention.

Figure 1B:
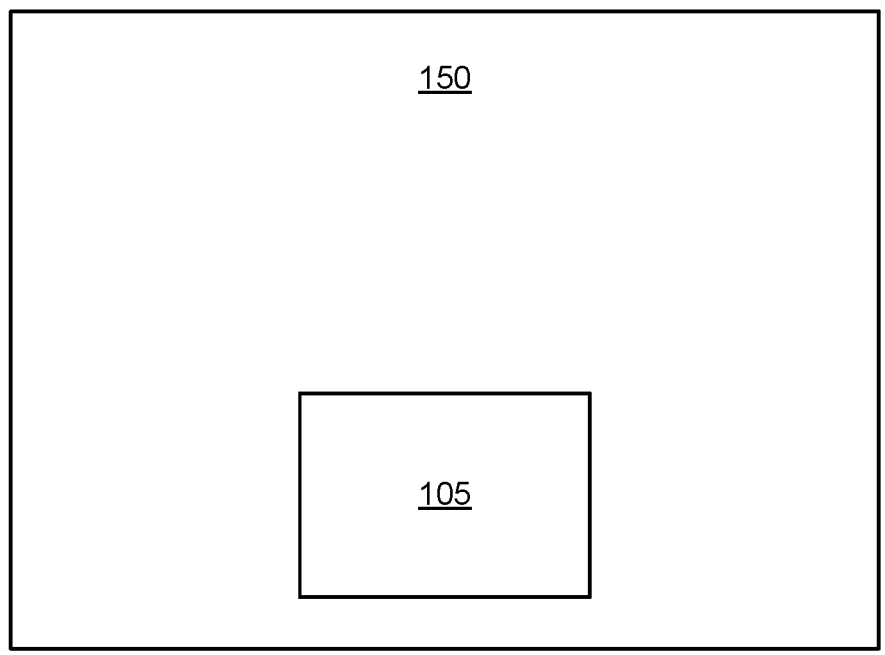
FIG. 1B shows a schematic representation of a microfluidic device including the connector assembly.
Figure 2:
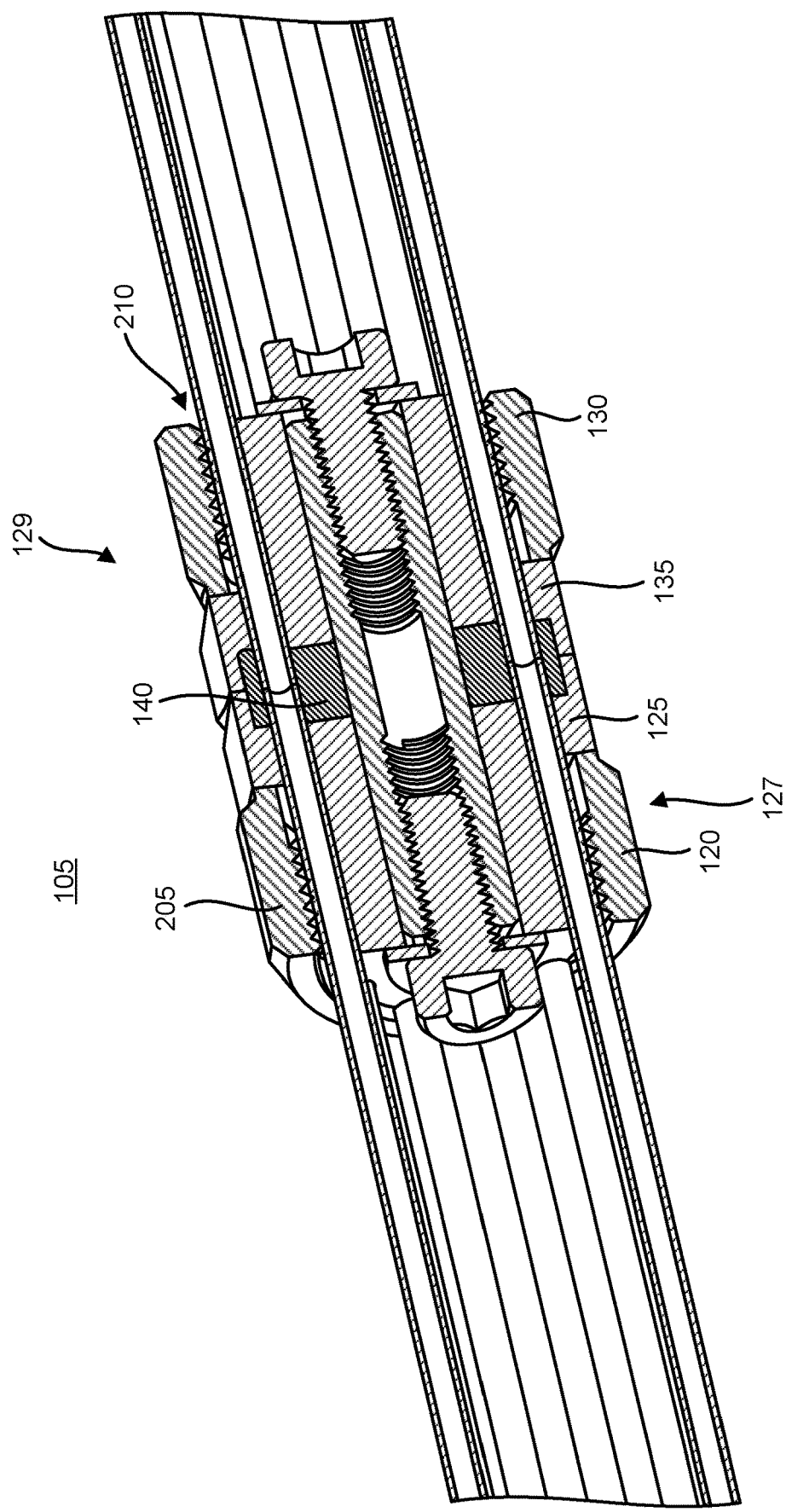
FIG. 2 shows a cross-sectional view of the connector assembly of FIG. 1.
Figure 3:
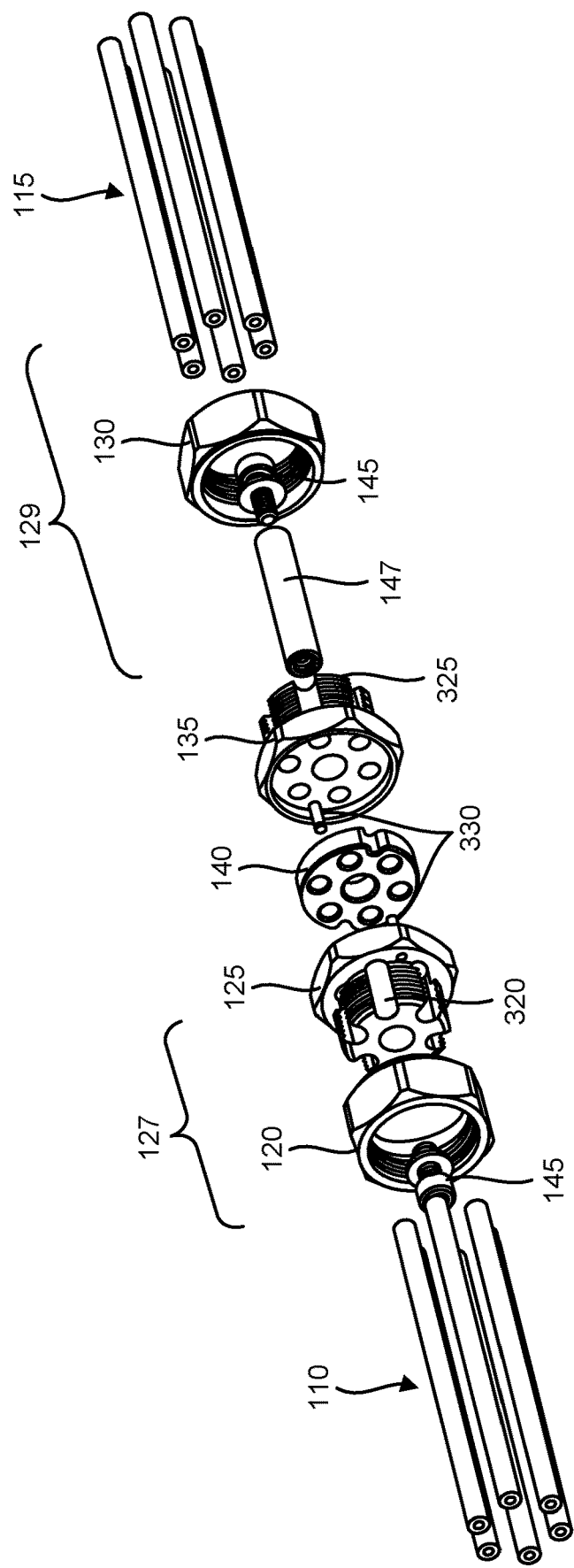
FIG. 3 shows an exploded view of the connector assembly.

FIG. 1A shows a perspective view of an example connector assembly 105 (also referred to as a multiport coupling device) that is configured to fluidly and removably connect a first set of microtubes 110 to a second set of microtubes 115 of a microfluidic device. FIG. 1B shows a schematic representation of a microfluidic device 150, which includes or is otherwise coupled to the connector assembly 105. The connector assembly 105 can be at least partially contained within or attached to the microfluidic device 150. The connector assembly 105 may also be at least partially formed by at least a portion of a structure of the microfluidic device 150. FIG. 2 shows the connector assembly 105 in cross-section. FIG. 3 shows the connector assembly 105 in an exploded state. The quantity of microtubes can vary. In the embodiment of FIG. 1A, the first set of microtubes 110 and second set of microtubes 115 each include six microtubes. In another example embodiment, each set includes ten microtubes although as mentioned the quantity can vary. For example, each set may include 10, 12, 14, 16, 18, or 20 microtubes. In embodiments, each set includes 6, 7, 8, 9, 10, 11, or 12 microtubes.

With reference to FIG. 1A, the connector assembly 105 includes a first cap 120 co-axially coupled to a first port connector 125 to collectively form a first connector 127 connected to the first set of microtubes 110. The microtubes 110 collectively form a ring or annular shaped arrangement around a periphery region of the first connector 127.

The connector assembly 105 further includes a second cap 130 that is co-axially coupled to a second port connector 135 to collectively form a second connector 129 connected to the second set of microtubes 115. The microtubes 115 collectively form a ring or annular shaped arrangement around a periphery region of the first connector 129. In the illustrated example, the first cap 120 and second cap 130 are each an annular structure having a substantially round or circular outer shape. The first port connector 125 and the second port connector 135 are each also an annular structure having a substantially round or circular outer shape. It should be appreciated that the shapes of the first cap 120, second cap 130, first port connector 125, and second port connector 130 can vary. For example, the shapes can vary to accommodate or conform to various shapes of corresponding gaskets, as described below.

As shown in the exploded view of FIG. 3, the first cap 120 can define an annular opening that receives at least a portion of the first port connector 125. The second cap 130 can similarly have an annular opening that receives the second port connector 135 as shown in FIG. 3.

As shown in FIGS. 2 and 3, a single gasket 140 is seated or positioned within the connector assembly 105 such as between the first port connector 125 and the second port connector 135. In an embodiment, the gasket 140 is the sole gasket of the connector assembly 105. The gasket 140 can initially be seated within the first connector 127 such as within the first port connector 125. A pair of cap screws 145 (FIG. 3) are threadedly positioned within the connector assembly 105 such as within a coaxial tubular connector 147. The cap screws 145 can be used to secure the first connector 127 to the second connector 129. Alternative securing mechanisms may be used, including clamps (e.g., quick-release clamps) or vices, latch, or hooks, to secure the first connector 127 to the second connector 129.

In embodiments, a gasket is a material or combination of materials clamped between two or more separable members (e.g., connectors). The gasket functions to create a seal between the members and maintain the seal for an extended period of time. The gasket may be made from any suitable material, such as rubber, polytetraflouroethylene (PTFE), silicone, cork, felt, neoprene, nitrile rubber, fiberglass, a plastic polymer (e.g., polychlorotrifluoroethylene), or a combination thereof. In embodiments, the gasket is a silicone rubber. In embodiments, the gasket is ELASTOSIL® LR 3003/40 A/B. In embodiments, the gasket is compressible. In embodiments, the gasket further includes a surface coating. Such surface coatings are used to reduce nonspecific binding of moieties in the various reagents to the surfaces. In some embodiments, the coatings intended to reduce nonspecific binding may include PEG (Polyethylene Glycol), BSA (Bovine Serum Albumin), PEI (Polyethylenimine), PSI (Polysuccinimide), DDM (n-dodecyl-b-D-maltocide), fluorinated coatings, Teflon coatings, silanization coatings, or other appropriate coating.

As shown in the cross-sectional view of FIG. 2, the first set of microtubes 110 and the second set of microtubes 115 have end regions that are positioned in co-axial alignment (i.e., 100% co-axial alignment) within the connector assembly 105 wherein the end regions are fluidly coupled to one another at a location where the gasket 140 is positioned, such as within bore(s) of the gasket. The gasket 140 as well as the first port connector 125 and second port connector 135 can have one or more bores, slots, seats or other structures sized and shaped to receive and align a respective microtube within the connector assembly 105, as shown in FIGS. 2 and 3. Thus, the first connector 127 and the second connector 129 (as well as their respective components) can each include one, two or more, at least two, or a plurality of bores that can be sized and shaped to receive or at least partially receive a microtube. In embodiments, the gasket 140, the first port connector 125, and second port connector 135 has 2, 3, 4, 5, 6, 8, 9, 10, 11, or 12 bores, slots, seats or other structures sized and shaped to receive and align a respective microtube within the connector assembly 105.

Figure 6:
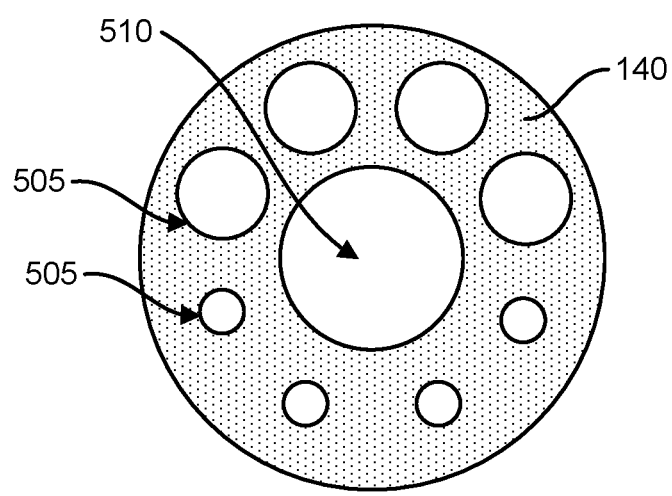

The gasket 140 serves as single or sole seal that commonly seals all the end-to-end connections between the first set of microtubes 110 and the second set of microtubes 115. As shown in the exploded view of FIG. 3, the gasket 140 includes a respective bore for each of the microtubes wherein the bores define connection locations where the ends of the microtubes fluidly couple to one another in an end-to-end fashion such that the connection locations between the microtubes are positioned within the single gasket 140. Each bore is sized and shaped to receive a respective microtube in a complementary manner. In embodiments, the connector includes differently sized bores. For example, FIG. 6 shows a gasket 140 having an annular-shaped arrangement of bores 505 wherein the bores vary in diameter.

The use of a single gasket 140 shared between the first connector 127 and the second connector 129, as shown for example in FIG. 2, is different and advantageous over a separate gasket residing in each of the first connector 127 and the second connector 129 (e.g., two gaskets). For example, when the two connectors each include a gasket the microtubes may not achieve 100% alignment and can create a flow choke point, throttling flow rates. In contrast, in the connector assembly 105 one of the connectors (e.g. the first connector 127, which can be a male connector) contains the gasket 140, whereas the second connector 129 (which can be female) receives the gasket 140 when the connector assembly 105 is assembled. When the two connectors 127 and 129 are joined and secured the resulting pressure is transferred to the gasket 140, maintaining the seal, maintaining the flow rate, and avoiding possible fluid exposure with the gasket.

With reference again to FIG. 2, the first cap 120 includes internal threads 205 that are configured to grip a respective microtube to provide a secure connection with the respective microtube. Such a secure connection reduces the likelihood that a microtube will be pulled out of the connector assembly. The second cap 130 also includes threads 210 for securing the respective microtubes in the second cap 130. As shown in FIG. 3, the first port connector 125 includes a series of seats 320 in which respective microtubes can be aligned, seated or otherwise positioned. The second port connector 135 includes seats 325 for the respective microtubes of the second port connector 135. When the microtubes are positioned in the seats 320 or 325 (FIG. 3) the threads 205 and 210 (FIG. 2) provide secure gripping with the respective microtubes.

The threads 205 and 210 provide multiple points of contact for the respective microtubes which are advantageous over a single point of contact. That is, the threads 205 and 210 extend over a distance along at least a portion of the length of a respective microtube. Each thread forms a structure that provides a plurality of contact points between the respective microtube and the first cap 120 or second cap 130. Experiments with a single point of contact failed to retain the tube in the junction or connection with the connector assembly, especially when tension was applied on the tubes in different directions or at a slight angle. A single point of contact results in greatly diminished retention force that allows the tube to slide and subsequently create a leak. In contrast, including multiple points of contact with the microtube provided by the system improves retention of the tubing and prevents it from accidentally dislodging or being pulled out during operation. In embodiments, the microtube includes one or more notches or grooves to further facilitate retention.

The connector assembly 105 can also include one or more alignment pins 330 (FIG. 3) that are configured to mate and align the first connector 127 and second connector 129 (FIG. 1A) in a proper orientation.

Figure 4:
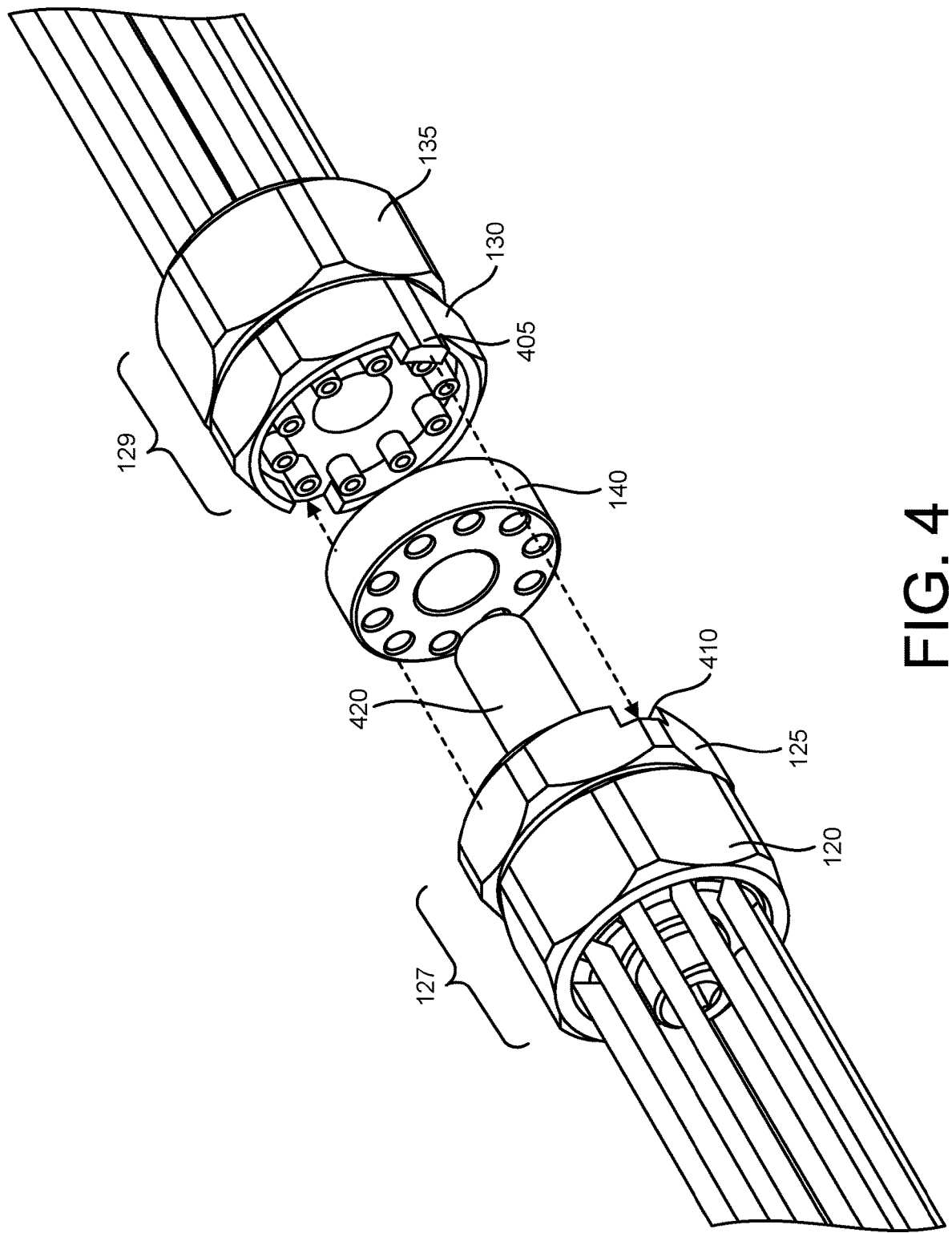
FIG. 4 shows another embodiment of a connector assembly.

As shown in another embodiment of FIG. 4, the first cap 120 and the first port connector 125 collectively form a first connector 127 (which is a male connector) while the second cap 130 and the second port connector 135 collectively form the second connector 310 (which is a female connector.) The first connector 127 has a male member 420 that inserts into the second connector 129 (as well as through the gasket 140) in a male-female relationship. Alignment of the first connector 127 to the second connector 129 can be facilitated by the use of a mating key-notch feature, as shown in FIG. 4. For example, the first connector 127 can include a notch 410 sized and shaped to receive a complementary-shaped key 405 of the second connector 129. The key-notch feature prevents rotation of the two halves and facilitates alignment. For example, the key-notch feature enables 1:1 registration between the two sets of tubes allowing, for example tube A1 to mate with tube A2, and tube B1 to mate to tube B2, etc.

Figure 5:
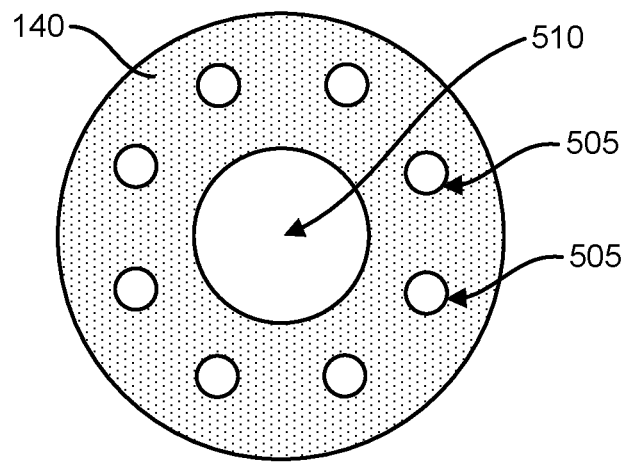
FIGS. 5-8 show a plan views of a gasket embodiments of the connector assembly.

FIG. 5 shows a plan view of the gasket 140 of the example connector assemblies described above. As mentioned, the gasket 140 (as well as the first port connector 125 and second port connector 135) has one or more bores 505 (or other structure such as slots, seats, openings, etc.) sized and shaped to receive and align a respective microtube. As mentioned, the first port connector 125 and second port connector 135 also have a corresponding arrangement of bores that align with the bores 505 of the gasket 140.

In the example of FIG. 5, the gasket 140 has an annular-shaped arrangement of bores 505 that extend around a peripheral region of the gasket 140. The gasket 140 also has a central connector opening 510 that can receive a connector element (such as the male member 420 shown in FIG. 4.) It should be appreciated that the bores 505 can vary in size or shape such as to accommodate microtubes of varying sizes and shapes. For example, FIG. 6 shows a gasket 140 having an annular-shaped arrangement of bores 505 wherein the bores vary in diameter.

Figure 7:
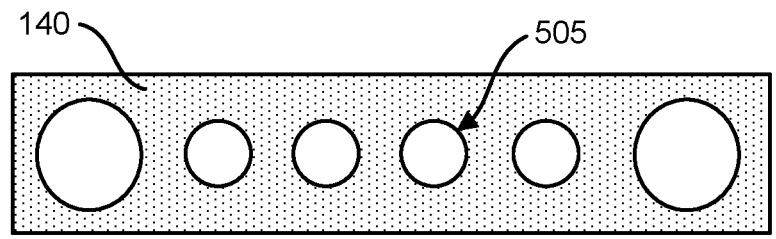
Figure 8:
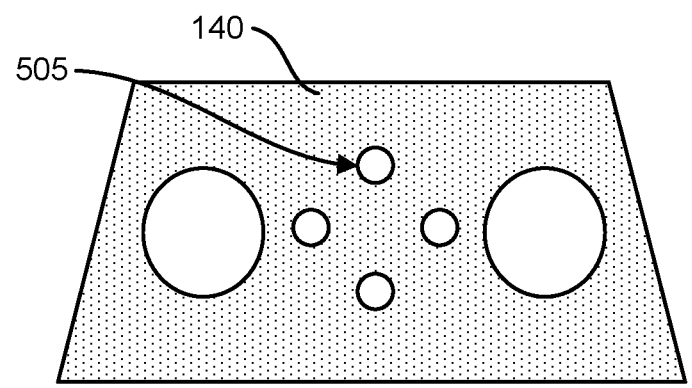

The spatial arrangement of the bores 505 can also vary to accommodate various spatial arrangement of microtubes in the connector assembly 105. In this regard, the microtubes can be arranged in any of a variety of spatial arrangements and/or shapes. The shapes of any or all the components of the connector assembly 105 (such, for example, as the first port connector 125, second port connector 135, first cap 120, and second cap 130) can also vary to accommodate various microtube spatial arrangements. For example, FIG. 7 shows a plan view of a rectangular (relative to the plan view) gasket 140 wherein the bores 505 are arranged along a common axis to accommodate and align with a corresponding arrangement of microtubes. FIG. 8 show another example of a gasket 140 wherein the bores 505 are arranged in a square or diamond pattern to accommodate and align with a corresponding arrangement of microtubes. As mentioned, the quantity of bores 510 and spatial arrangement of bores 510 can vary.

Figure 9:
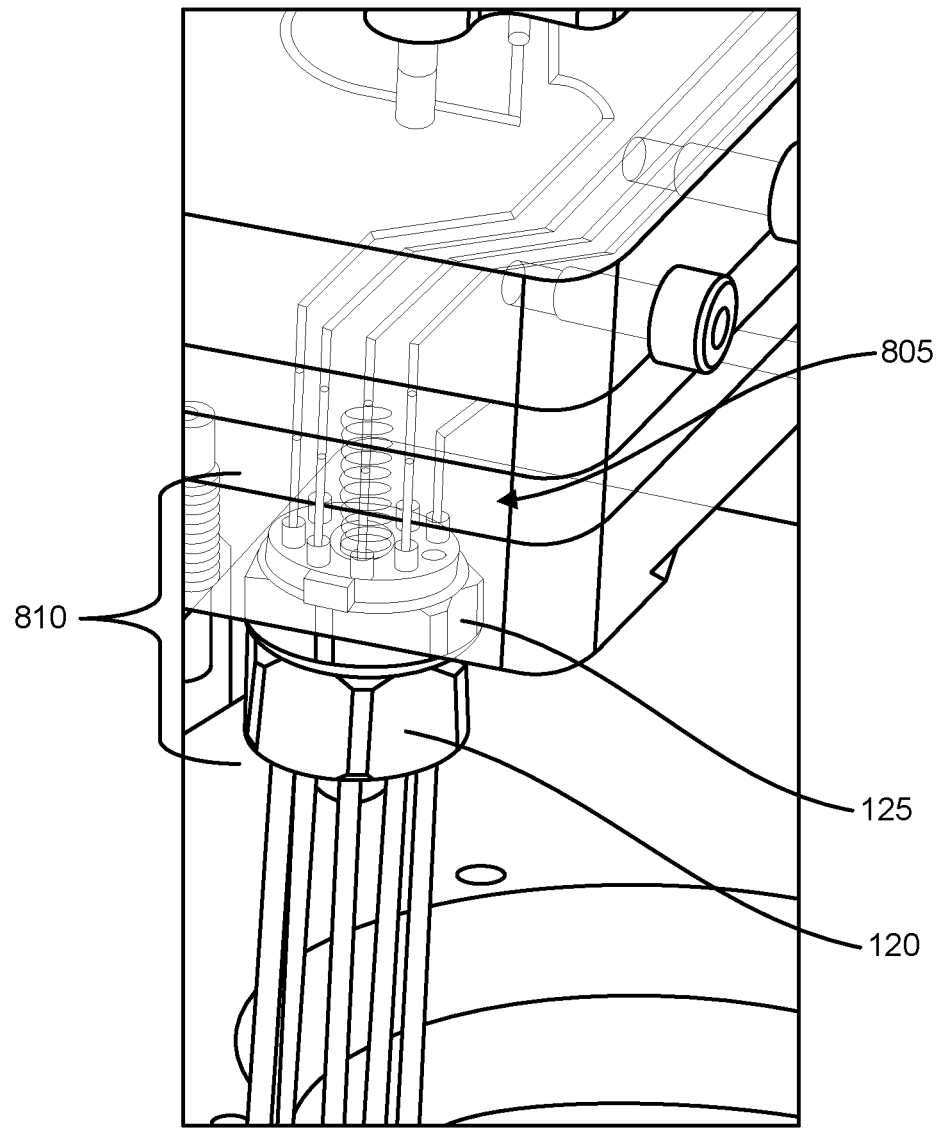
FIG. 9 shows an alternate embodiment of the connector assembly.

FIG. 9 shows an alternate embodiment of the connector assembly wherein at least a portion of the connector assembly is incorporated or otherwise formed by a portion of the microfluidic device 150, such a manifold portion 805 of the microfluidic device 150. In the embodiments of the connector assembly 105 described above, the connector assembly 150 is free-standing in that the connector assembly includes stand-alone portions (e.g., the first cap 120, second cap 130, first port connector 125, and second port connector 135) that couple to respective microtubes. In the example embodiment shown in FIG. 8, the connector assembly 810 is formed by the first cap 120 and first port connector 125 (which collectively form the first connector 127 as shown in FIG. 1A and which are stand-alone components) while another portion of the connector assembly 810 is formed or otherwise integrated into the microfluidic device, such the manifold portion 805. Thus, while the connector assembly shown in FIG. 1 includes a standalone second cap 130 and second port connector 135 (which collectively form the second connector 129), the embodiment of FIG. 8 does not include these standalone portions, which are now incorporated directly into the manifold portion 805. The manifold portion 805 may include a cut-out or other feature that receives or couples to the connector assembly.

The microfluidic device can include a reaction vessel or solid support for carrying out a nucleic acid detection method. For example, the device can include an array, flow cell, multi-well plate or other convenient reaction apparatus. The reaction vessel or solid support (e.g., flow cell) can be removable, thereby allowing it to be placed into or removed from the device. As such, the microfluidic device can be configured to sequentially process a plurality of reaction vessels or solid supports. The device can include reservoirs for containing one or more of the reagents (e.g., polymerase, primer, template nucleic acid, and nucleotides. The microfluidic device can further include a detection apparatus. Any of a variety of detection apparatus can be configured to detect the reaction vessel or solid support where reagents interact. Examples include luminescence detectors, surface plasmon resonance detectors and others known in the art. Exemplary systems having fluidic and detection components that can be readily modified for use in a system herein include, but are not limited to, those set forth in U.S. Pat. Nos. 8,241,573, 8,039,817; or US Pat. App. Pub. No. 2012/0270305 A1, each of which is incorporated herein by reference. In embodiments, the microfluidic device further includes one or more excitation lasers.

Examples

In embodiments, the fluidics circuit of a microfluidic device is combined with fluidic reservoirs, valves, pressure sources, pumps, control systems, and/or like components, to form a fluidics system for delivering separate fluid flows with predetermined rates and durations to a common volume, such as an outlet, chamber, flow cell, or the like. Such fluidics circuits are particularly useful in fluidics systems in apparatus for carrying out multi-step chemical, enzymatic, or electrochemical processes, such as the apparatuses described in Margulies et al, Nature, 437: 376-380 (2005); Brenner et al, Nature Biotechnology, 18: 630-634 (2000); and Ronaghi et al, Science, 281: 363-365 (1998).

In embodiments, multiport disconnect devices are particularly well suited for meso-scale and micro-scale fluidics systems, for example, fluidics systems having passage cross-sections in the range of tens of square microns to a few square millimeters, or having flow rates in the range of from a few nL/sec to a hundreds of µL/sec. For example, in embodiments, the flow rate is from about 50 µL to about 500 µL/min. In embodiments, the flow rate is between 10-100 µl/min.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub-combination or a variation of a sub combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

What is claimed is:

1. A multiport coupling device of a microfluidic device, comprising:
  a first connector that includes at least two bores;
  a second connector that includes at least two bores, wherein the second connector couples to the first connector;
  a gasket seated in the first connector, wherein the gasket defines a connection location configured to receive at least a first microtube and a second microtube and wherein the connection location of the gasket provides a seal between the first microtube and the second microtube;
  a first retention mechanism configured to retain the first microtube within the multiport coupling device; and a second retention mechanism configured to retain the second microtube within the coupling device.

2. The multiport coupling device of claim 1, wherein at least one of the first retention mechanism and the second retention mechanism is a thread.

3. The multiport coupling device of claim 1, wherein the gasket is positioned between the first connector and the second connector when the first connector couples to the second connector.

4. The multiport coupling device of claim 1, wherein the gasket is the sole gasket of the multiport coupling device.

5. The multiport coupling device of claim 1, wherein the at least two bores of the first connector co-axially align with the at least two bores of the second connector when the first connector couples to the second connector.

6. The multiport coupling device of claim 5, wherein the gasket includes at least two bores that co-axially align with the at least two bores of the first connector and the at least two bores of the second connector when the first connector couples to the second connector.

7. The multiport coupling device of claim 1, further comprising one or more alignment pins that are configured to mate and align the first connector and second connector in a proper orientation.

8. The multiport coupling device of claim 1, wherein the first connector couples to the second connector in a male-female relationship.

9. The multiport coupling device of claim 8, wherein the first connector includes a male member that inserts into the second connector.

10. The multiport coupling device of claim 1, wherein the first connector includes a notch that is sized and shaped to receive a complementary key of the second connector.

11. The multiport coupling device of claim 1, further comprising the first microtube and the second microtube.

12. The multiport coupling device of claim 1, wherein the first connector attaches to a first set of microtubes that includes the first microtube and a second set of microtubes that includes the second microtube.

13. A microfluidic device, comprising:
two or more inlet microtubes;
two or more outlet microtubes;
a multiport coupling device configured to connect the two or more inlet microtubes to the two or more outlet microtubes at a connection location, the multiport connector comprising;
a first connector that includes a plurality of bores in which the two or more inlet microtubes are seated;
a second connector that includes a plurality of bores in which the two or more outlet microtubes are seated, wherein the second connector couples to the first connector;
a gasket seated in the first connector, wherein the connection location is positioned entirely within the gasket;
a first retention mechanism of the plurality of bores of the first connector, the first retention mechanism configured to retain the two or more inlet microtubes within the first connector; and
a second retention mechanism of the plurality of bores of the second connector, the second retention mechanism configured to retain the two or more outlet microtubes within the second connector.

14. The microfluidic device of claim 13, wherein at least one of the first retention mechanism and the second retention mechanism is a thread.

15. The microfluidic device of claim 13, wherein the gasket is positioned between the first connector and the second connector when the first connector couples to the second connector.

16. The microfluidic device of claim 13, wherein the gasket is the sole gasket of the multiport coupling device.

17. The microfluidic device of claim 13, further comprising one or more alignment pins that are configured to mate and align the first connector and second connector in a proper orientation.

18. The microfluidic device of claim 13, wherein the first connector couples to the second connector in a male-female relationship.

19. The microfluidic device of claim 18, wherein the first connector includes a male member that inserts into the second connector.

* * * * *